US012141263B2

(12) United States Patent
Boyapalle et al.

(10) Patent No.: US 12,141,263 B2
(45) Date of Patent: Nov. 12, 2024

(54) WORKSPACE ROOT-OF-TRUST

(71) Applicant: Dell Products, L.P., Round Rock, TX (US)

(72) Inventors: Anantha K. Boyapalle, Cedar Park, TX (US); Vivek Viswanathan Iyer, Austin, TX (US)

(73) Assignee: Dell Products, L.P., Round Rock, TX (US)

(*) Notice: Subject to any disclaimer, the term of this patent is extended or adjusted under 35 U.S.C. 154(b) by 119 days.

(21) Appl. No.: 17/805,472

(22) Filed: Jun. 6, 2022

(65) Prior Publication Data

US 2023/0394129 A1 Dec. 7, 2023

(51) Int. Cl.
*G06F 21/33* (2013.01)
*H04L 9/08* (2006.01)

(52) U.S. Cl.
CPC ............ *G06F 21/33* (2013.01); *H04L 9/0877* (2013.01)

(58) Field of Classification Search
USPC .......................................................... 726/17
See application file for complete search history.

(56) References Cited

U.S. PATENT DOCUMENTS

| 5,953,425 | A * | 9/1999 | Selker ...................... G07C 9/28 235/382 |
| 9,893,882 | B1 * | 2/2018 | Thadishetty .......... H04L 9/0897 |
| 10,516,668 | B2 * | 12/2019 | Stedman ................. G06F 21/62 |
| 11,902,266 | B1 * | 2/2024 | Basta ...................... H04L 63/08 |
| 2011/0084666 | A1 * | 4/2011 | Dandekar ............. H02J 7/0048 726/17 |
| 2014/0173700 | A1 * | 6/2014 | Awan ..................... H04W 12/02 726/4 |
| 2021/0258171 | A1 * | 8/2021 | Lee ........................ G06F 21/36 |
| 2022/0012187 | A1 * | 1/2022 | Contreras Munoz ... G06F 21/44 |
| 2022/0350660 | A1 * | 11/2022 | Gatson ................. G06F 9/3891 |

FOREIGN PATENT DOCUMENTS

| CA | 2824884 A1 * | 7/2012 | ............. G06F 21/82 |
| CN | 104854760 A * | 8/2015 | ............. G06F 1/163 |
| CN | 113811873 A * | 12/2021 | ............. G06F 21/33 |
| JP | 2015523782 A * | 5/2013 | ............. G06F 1/1632 |
| RU | 2713625 C2 * | 2/2020 | ............. G06F 1/1632 |
| WO | WO-2014139868 A1 * | 9/2014 | ............. G06F 3/0383 |

OTHER PUBLICATIONS

Holt (Year: 2015).*

* cited by examiner

*Primary Examiner* — Sakinah White Taylor
(74) *Attorney, Agent, or Firm* — Fogarty LLP

(57) ABSTRACT

Systems and methods for providing a workspace Root-of-Trust (RoT) are described. In an embodiment, an Information Handling System (IHS) may include a processor and a memory coupled to the processor, the memory having program instructions stored thereon that, upon execution, cause the IHS to receive a digital certificate from each of a plurality of peripheral devices coupled to the IHS in a workspace and combine at least portions of the digital certificates to create a workspace certificate unique to the workspace.

20 Claims, 5 Drawing Sheets

WORKSPACE ROOT-OF-TRUST

FIELD

This disclosure relates generally to Information Handling Systems, and, more specifically, to systems and methods for providing a workspace Root-of-Trust (RoT).

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for providing a workspace Root-of-Trust (RoT) are described. In an illustrative, non-limiting embodiment, an Information Handling System (IHS) may include a processor and a memory coupled to the processor, the memory having program instructions stored thereon that, upon execution, cause the IHS to receive a digital certificate from each of a plurality of peripheral devices coupled to the IHS in a workspace and combine at least portions of the digital certificates to create a workspace certificate unique to the workspace.

In some cases, the plurality of peripheral devices may include a docking station. Additionally, or alternatively, the plurality of peripheral devices may include at least one of: a display, an audio device, a user input device, or a video device. The workspace certificate may include an indication of a workspace identifier. Additionally, or alternatively, the workspace certificate may include an indication of at least one of: an IHS identifier, an IHS service tag, or a user identifier. Additionally, or alternatively, the workspace certificate may include, for one or more of the plurality of peripheral devices, an indication of at least one of: a device class, a device type, a vendor identifier, a firmware revision, a device topology, a bus capability, or a supported protocol.

The workspace certificate may be encrypted with a key provided by a Trusted Platform Module (TPM) of the IHS. The key may include a public Endorsement Key (EK). The program instructions, upon execution, may cause the IHS to transmit an encrypted copy of the workspace certificate to a remote service configured to determine whether the workspace is intact. To determine whether the workspace is intact, the remove service may be configured to decrypt the encrypted copy of the workspace certificate with the key.

The program instructions, upon execution, may also cause the IHS to: detect an addition or removal of a peripheral device to or from the plurality of peripheral devices to produce a modified workspace; and in response to the detection, create a modified workspace certificate unique to the modified workspace. The program instructions, upon execution, may further cause the IHS to transmit an encrypted copy of the modified workspace certificate to a remote service configured to determine whether the workspace is intact.

In another illustrative, non-limiting embodiment, a method may include receiving a workspace certificate from an IHS or a docking station disposed in a workspace having a plurality of peripheral devices uniquely associated with the workspace and coupled to the IHS or the docking station, where the workspace certificate is created based, at least in part, upon a combination of at least portions of digital certificates provided by each of the plurality of peripheral devices; and determining whether the workspace is intact based upon contents of the workspace certificate.

The method may include decrypting the workspace certificate using a public EK of a TPM of the user's IHS. The contents of the workspace certificate may include an indication of at least one of: a workspace identifier, an IHS identifier, an IHS service tag, or a user identifier. Additionally, or alternatively, the contents of the workspace certificate may include, for one or more of the plurality of peripheral devices, an indication of at least one of: a device class, a device type, a vendor identifier, a firmware revision, a device topology, a bus capability, or a supported protocol.

In yet another illustrative, non-limiting embodiment a memory storage device may have program instructions stored thereon that, upon execution by an IHS, cause the IHS to: receive a digital certificate from each of a plurality of peripheral devices coupled to a user's IHS in a workspace; and combine at least portions of the digital certificates to create a workspace certificate unique to the workspace. The program instructions, upon execution, may also cause the IHS to transmit an encrypted copy of the workspace certificate to a remote service configured to determine whether the workspace is intact.

The program instructions, upon execution, may cause the IHS to create the encrypted copy using a public EK of a TPM of the IHS. The program instructions, upon execution, may further cause the IHS to: detect an addition or removal of a peripheral device to or from the plurality of peripheral devices to produce a modified workspace; and in response to the detection, create a modified workspace certificate unique to the modified workspace.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
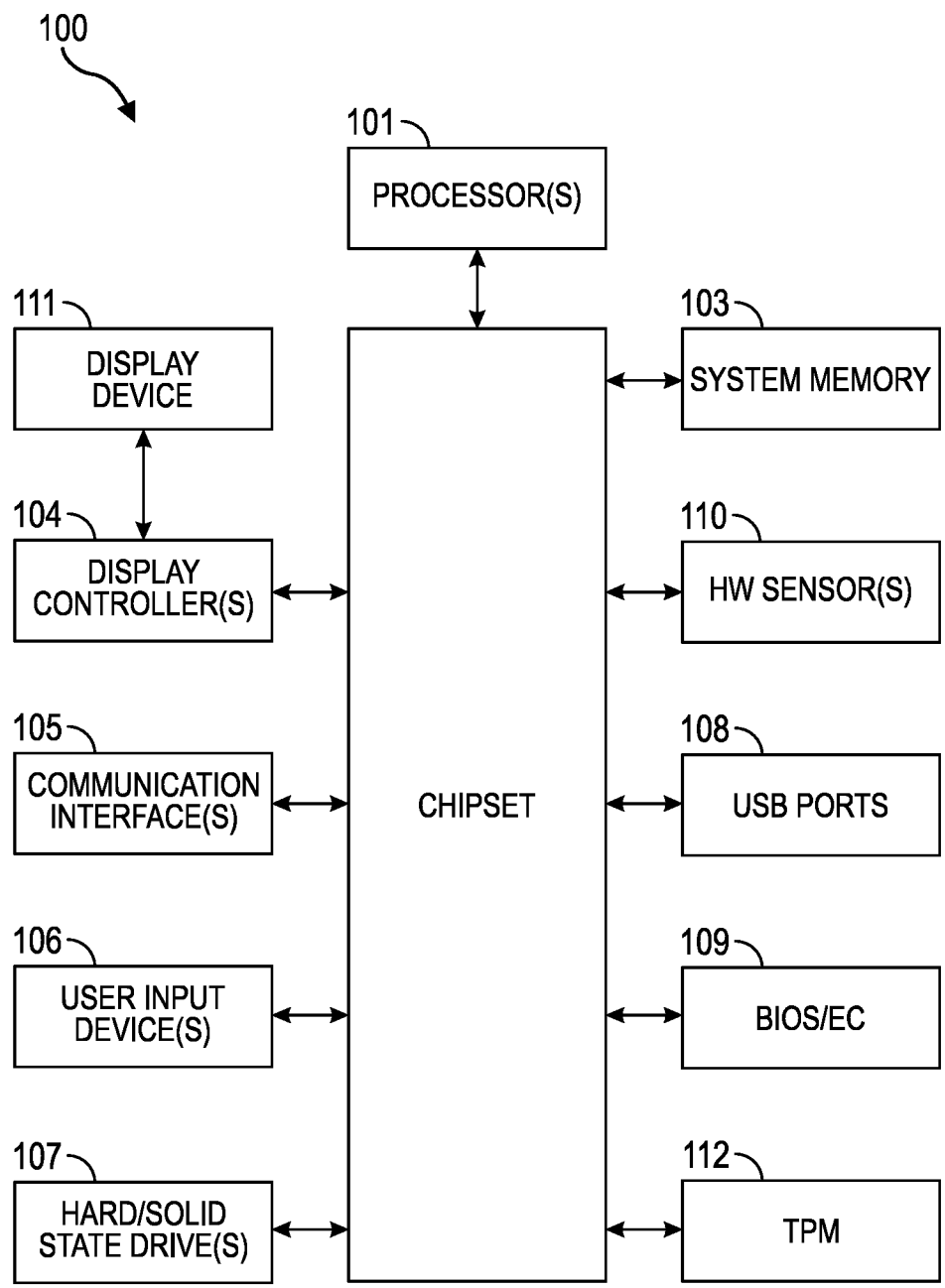
FIG. 1 depicts a block diagram of examples of components of an Information Handling System (IHS), according to some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include random access memory (RAM), one or more processing resources such as a central processing unit (CPU) or hardware or software control logic, ROM, and/or other types of nonvolatile memory. Additional components of an IHS may include one or more disk drives, one or more network ports for communicating with external devices as well as various input and output (I/O) devices, such as a keyboard, a mouse, touchscreen and/or a video display. An IHS may also include one or more buses operable to transmit communications between the various hardware components. A more detailed example of an IHS is described with respect to FIG. 1. It should be appreciated that although certain embodiments are discussed in the context of a personal computing device, other embodiments may utilize other types of IHSs.

In modern enterprises, the term "hoteling" (or "office hoteling"), shared workspaces, or co-working spaces collectively refer to physical environments where clients, users, or employees can schedule their hourly, daily, or weekly use of individual spaces, such as office desks, cubicles, or conference rooms—thus serving as an alternative to conventional, permanently assigned seating. In some cases, hoteling clients, users, or employees access a reservation system to book an individual space (e.g., a desk, a cubicle, a conference room, an office, etc.) before they arrive at work, which gives them freedom and flexibility to work wherever they want to. In other cases, individual spaces may also be available to users without a reservation system on a first-come, first-serve basis (e.g., in the lobby of a hotel or in a library).

Each individual space may include its own set of peripheral devices (e.g., cameras or webcams, microphones, speakers, displays, docking stations, keyboards, mice, etc.). When a client, user, or employee reaches an individual space, they can bring their own IHSs and choose between using devices integrated into their IHS or any of the external devices found in that space.

When a client, user, or employee arrives at a particular workspace, their IHS may be coupled to one or more A/V peripheral devices via a Workspace Managing Device (WMD) such as a dock, docking station, intelligent hub, external display, wireless KVM, or other IHS. Additionally, or alternatively, the IHS may be directly coupled to one or more peripheral devices using any suitable wireless communication protocol (e.g., BT, BT LOW ENERGY or "BLE," ZIGBEE, Z-WAVE, WI-FI, WI-FI DIRECT, etc.). Additionally, or alternatively, a workspace may be served by one of a plurality of distributed Access Points (APs) for network/Internet connectivity, such as wireless routers or the like.

As such, users typically connect to different peripheral devices each workday, particularly when executing collaboration applications, such as audio or video conferencing applications (e.g., ZOOM, TEAMS, etc.), or the like, depending upon the workspace they are in. For example, a user may employ a BLUETOOTH (BT) speaker with integrated microphone and webcams when in a home environment, a BT headset with an external webcam in a cubicle environment, or a BT headset with integrated webcam when working from anywhere else. In different work environments, different combinations of devices may be available to the user.

Each time the user selects a particular work location, set of peripheral devices, and/or application(s) to execute, a new workspace is effectively produced. The term "workspace," a used herein, refers to a combination of IHS, location, peripheral devices, and/or applications available to, or used by a user, during a given session. In various embodiments, systems and methods described herein provide techniques whereby a "workspace Root-of-Trust (RoT)" is established on the user's IHS and tied back to the peripheral devices and workspace being used.

The term "RoT" refers a source that is trusted within a cryptographic system. Moreover, the term "workspace RoT" refers to a system that uses a client IHS's Trusted Security Module (TPM), or other security processor, to establish a hardware RoT with respect to selected aspects of a workspace, including its associated peripheral devices.

In various embodiments, a workspace RoT may be used to protect a "workspace" as an entire group, as opposed to individual devices in their respective silos. In some cases, a workspace RoT may be used to ensure secure: data management (e.g., mixing corporate and personal data, configuration data within or across workspace devices, etc.), collect video data (e.g., for privacy, etc.), telemetry collection, Artificial Intelligence/Machine Learning (AI/ML) data collection security, decentralized verification of trust (e.g., for compute, data, or communications within workspace, etc.), access controls to limit a user's reach to only permitted or reserved resources (e.g., transactional security that is time or policy driven to access IT resources, etc.), intermingling of user personal and corporate peripherals (e.g., reducing attack surfaces), etc.

A workspace RoT, as described herein, may be used to protect data ingress/egress points (e.g., when a USB storage device is plugged into the IHS or docking station and is capable of injecting or manipulating data, etc.), I/O across workspace devices (e.g., wired or wireless communication channels or ports, etc.), management of the workspace (e.g., secure firmware or software updates, secure configuration of parameters, etc.).

FIG. 1 is a block diagram of components of IHS 100, according to some embodiments. As depicted, IHS 100 includes processor 101. In various embodiments, IHS 100 may be a single-processor system, or a multi-processor system including two or more processors. Processor 101 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 102 coupled to processor 101. Chipset 102 may provide processor 101 with access to several resources. In some cases, chipset 102 may utilize a QuickPath Interconnect (QPI) bus to communicate with processor 101. Chipset 102 may also be coupled to communication interface(s) 105 to enable communications between IHS 100 and various wired and/or wireless networks, such as Ethernet, WiFi, BT, cellular or mobile networks (e.g., CDMA, TDMA, LTE, etc.), satellite networks, or the like. In some cases, communication interface(s) 105 may be used to communicate with A/V devices (e.g., BT speakers, microphones, headsets, etc.). Moreover, communication interface(s) 105 may be coupled to chipset 102 via a PCIe bus.

Chipset 102 may be coupled to display controller(s) 104, which may include one or more or graphics processor(s) (GPUs) on a graphics bus, such as an Accelerated Graphics Port (AGP) or Peripheral Component Interconnect Express (PCIe) bus. As shown, display controller(s) 104 provide video or display signals to display device 111. In other implementations, any number of display controllers or display devices may be used.

Display device 111 may include Liquid Crystal Display (LCD), Light Emitting Diode (LED), organic LED (OLED), or other thin film display technologies. Display device 111 may include a plurality of pixels arranged in a matrix, configured to display visual information, such as text, two-dimensional images, video, three-dimensional images, etc. In some cases, display device 111 may be provided as a single continuous display, rather than two discrete displays.

Chipset 102 may provide processor 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like. Memory 103 may store program instructions that, upon execution by processor 101, enable a collaboration mode for a touchpad coupled or integrated into IHS 100.

Chipset 102 may also provide access to one or more hard disk and/or solid-state drives 107. In certain embodiments, chipset 102 may also provide access to one or more optical drives or other removable-media drives. In certain embodiments, chipset 102 may also provide access to one or more USB ports 108, to which one or more A/V peripheral devices may be coupled (e.g., internal or external webcams, microphones, speakers, etc.).

Chipset 102 may further provide access to one or more user input devices 106, for example, using a super I/O controller or the like. Examples of user input devices 106 include, but are not limited to, a keyboard, mouse, touchpad, stylus or active pen, totem, etc. Each of user input devices 106 may include a respective controller (e.g., a touchpad may have its own touchpad controller) that interfaces with chipset 102 through a wired or wireless connection (e.g., via communication interfaces(s) 105).

In certain embodiments, chipset 102 may also provide an interface for communications with one or more hardware (HW) sensors 110. Sensors 110 may be disposed on or within the chassis of IHS 100, and may include, but are not limited to: electric, magnetic, radio, optical, infrared, thermal, force, pressure, acoustic, ultrasonic, proximity, position, deformation, bending, direction, movement, velocity, rotation, and/or acceleration sensor(s).

Upon booting of IHS 100, processor(s) 101 may utilize Basic Input/Output System (BIOS) instructions of BIOS/Embedded Controller (EC) 109 to initialize and test hardware components coupled to IHS 100 and to load an OS for use by IHS 100. BIOS 109 provides an abstraction layer that allows the OS to interface with certain hardware components that are utilized by IHS 100. Via the hardware abstraction layer provided by BIOS 109, software stored in system memory 103 and executed by processor 101 can interface with certain I/O devices that are coupled to IHS 100. The Unified Extensible Firmware Interface (UEFI) was designed as a successor to BIOS. As a result, many modern IHSs utilize UEFI in addition to or instead of a BIOS. As used herein, BIOS 109 is intended to also encompass a UEFI component.

EC 109 may be installed as a Trusted Execution Environment (TEE) component to the motherboard of IHS 100. EC 109 may implement operations for interfacing with a power adapter in managing power for IHS 100. Such operations may be utilized to determine the power status of IHS 100, such as whether IHS 100 is operating from battery power or is plugged into an AC power source. Firmware instructions utilized by EC 109 may be used to provide various core operations of IHS 100, such as power management and management of certain modes of IHS 100 (e.g., turbo modes, maximum operating clock frequencies of certain components, etc.).

In some implementations, a low-power mode of operation may include the S0 low-power idle model, also known as Modern Standby or Connected Standby, which provides an instant on/off user experience and maintains a network connection for certain processes while consuming very little power. These power modes may be entered, for example, when IHS 100 transitions into standby (e.g., "sleep," etc.).

EC 109 may also implement operations for detecting certain changes to the physical configuration or posture of IHS 100 and managing the modes of a touchpad or other user input device 106 in different configurations of IHS 100. For instance, where IHS 100 as a 2-in-1 laptop/tablet form factor, EC 109 may receive inputs from a lid position or hinge angle sensor 110, and it may use those inputs to determine: whether the two sides of IHS 100 have been latched together to a closed position or a tablet position, the magnitude of a hinge or lid angle, etc.

EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component. Such hash values may be calculated as part of a trusted process of manufacturing IHS 100 and may be maintained in secure storage as a reference signature. EC 109 may later recalculate the hash value for a component may compare it against the reference hash value to determine if any modifications have been made to the component, thus indicating that the component has been compromised. In this manner, EC 109 may validate the integrity of hardware and software components installed on IHS 100.

TPM 112 may include various registers, such as platform configuration registers, and secure storage, such as an NVRAM (Non-Volatile Random-Access Memory). TPM 112 may also include a cryptographic processor that supports various cryptographic capabilities, such as generating keypairs, calculating cryptographic signatures (e.g., hashes) and/or providing a persistent and secure memory for storage of keypairs. In embodiments that include TPM 112, a pre-boot process implemented by TPM 112 may utilize its cryptographic capabilities to calculate hash values that are based on software and/or firmware instructions utilized by certain core components of IHS 100, such as BIOS 109 and boot loader of IHS 100. These calculated hash values may then be compared against reference hash values that were previously stored in a secure non-volatile memory of the IHS, such as during factory provisioning of IHS 100. In this manner, TPM 112 may establish a RoT that includes core components of IHS 100 that are validated as operating using instructions that originate from a trusted source.

As such, TPM 112 may serve to establish an initial hardware RoT in IHS 100 such that the hardware components within this RoT operate using validated software instructions. In some embodiments, a validation process may compare identity information of TPM 112 against the TPM identity information parsed from an inventory certificate. In some instances, the detection of discrepancies between the identity of the TPM specified in the inventory certificate and the identity reported by TPM 112 may result in terminating further validation procedures or operations and/or signaling a potential compromise in the RoT hardware components of IHS 100.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, all or a portion of the operations executed by the illustrated components may instead be provided by components integrated into processor(s) 101 as systems-on-a-chip (SoC). As such, in certain embodiments, IHS 100 may be implemented as different classes of computing devices including, but not limited to: servers, workstations, desktops, laptops, appliances, video game consoles, tablets, smartphones, etc.

Figure 2A:
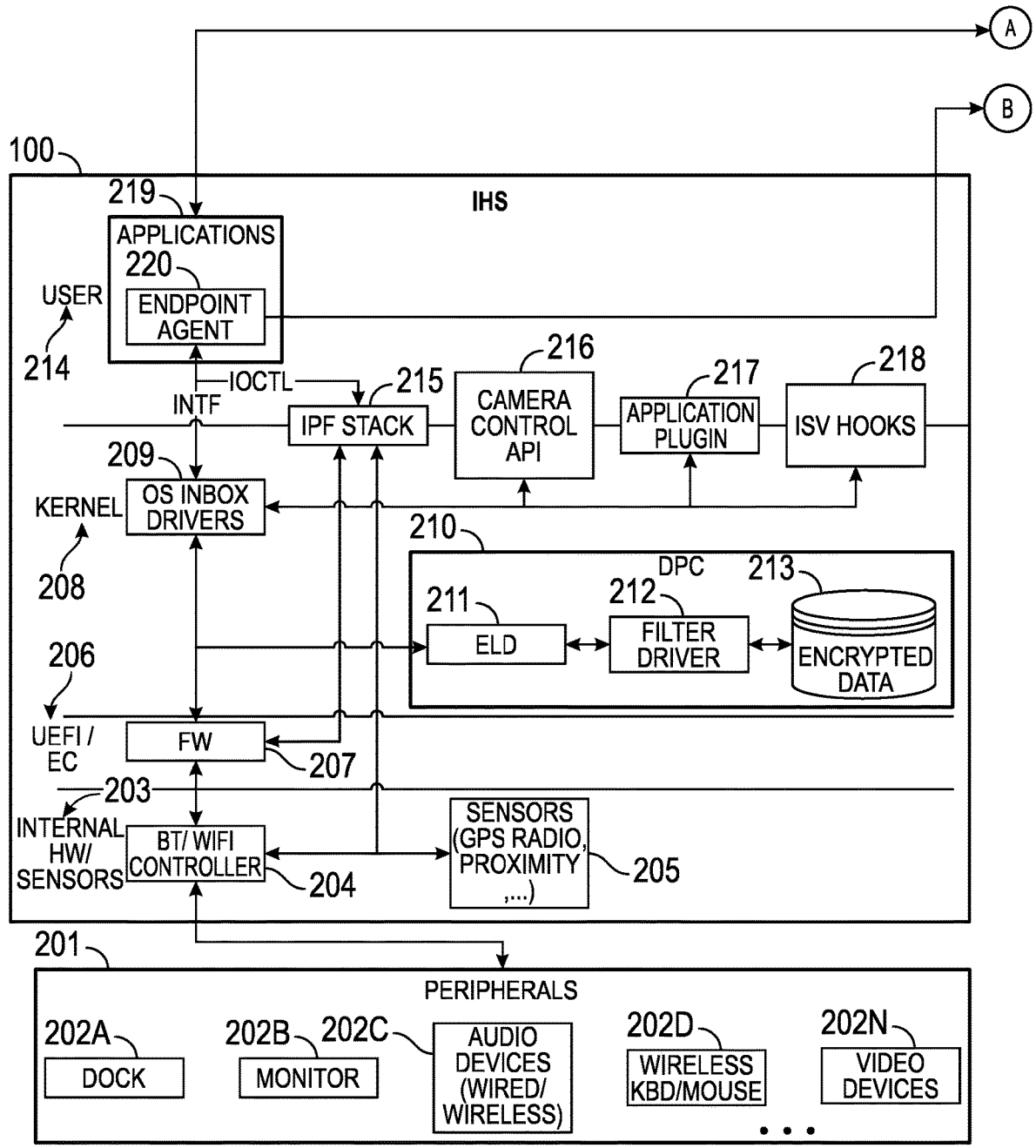
FIGS. 2A and 2B depict a block diagram of an example of a system for providing a workspace Root-of-Trust (RoT), according to some embodiments.
Figure 2B:
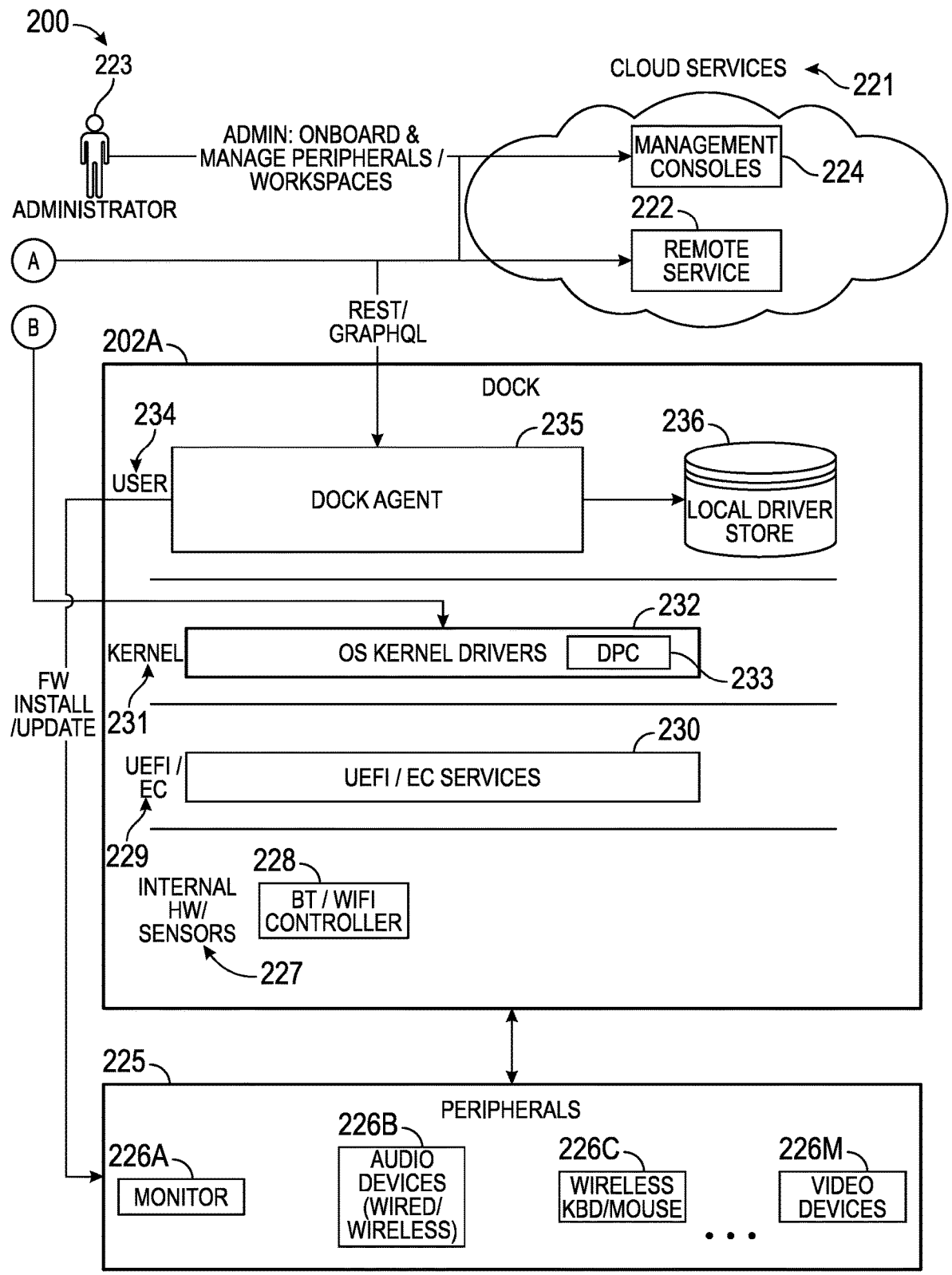

FIGS. 2A and 2B depict a block diagram of an example of a system for providing a workspace RoT, according to some embodiments. Particularly, as shown in FIG. 2A, IHS 100 may be disposed in a workspace (e.g., the user's home, a shared workspace, a cubicle, a desk, a conference room, a coffee shop, etc.) where physical peripheral devices 201 are available, including dock 202A, monitor 202B, audio devices 202C (e.g., USB or wireless microphone or speakers), wireless keyboard and/or mouse 202D, and video devices 202N (e.g., USB or wireless webcam). In some cases, IHS 100 may be coupled to one or more peripheral devices 202B-N via dock 202A.

System components of IHS 100 are divided into hardware/sensor layer 203, UEFI/EC layer 206, kernel space 208, and user space 214. Particularly, BT/WiFi controller 204 of hardware/sensor layer 203 and sensors 205 (e.g., HW sensors 110 in FIG. 1) are coupled to platform framework (IPF) stack 215 in user space 214. Firmware (FW) 207 of UEFI/EC layer 206 is coupled to BT/WiFi controller 204 in hardware/sensor layer 203, OS inbox drivers 209 in kernel space 208, and IPF stack 215 in user space 214. OS inbox drivers 209 are coupled to camera control Application Programming Interface (API) 216, application plugin 217, and Independent Software Vendor (ISV) hooks 218 (e.g., ZOOM, TEAMS, etc.).

Kernel space 208 also includes Peripheral Controller (DPC) 210, which in turn includes Early Loaded Driver (ELD) 211, filter driver 212, and encrypted data storage 213. ELD 211 ensures that DPC 210 has not been tampered with. For example, in case of tampering, ELD 211 may invalidate a corresponding Platform Configuration Register (PCR) in TPM 112. ELD 211 may get measured at early OS kernel 208 initialization in the driver load order.

Again, in the case of tampered ELD 211, the entire user workspace may be quarantined, and the user may be provided an option to either login through a Virtual Private Network (VPN) or remove/replace the peripheral devices that IHS 100 is connected to. When IHS 100 powers on, TPM 112 verifies whether the ELD code is legitimate using a key burned into it in the IHS factory.

ELD 211 also receives peripheral information and other workspace information (e.g., OS, applications, IHS location, IHS posture, etc.) from filter driver 212, and encrypts that data with a seal command using, for example, a Storage Root Key (SRK) of the TPM. The encrypted data is stored in the file system data storage 213 and tied to a workspace identifier (ID) and/or user ID of the user of IHS 100, for example, as shown in Table 1:

TABLE 1

| Workspace ID | User ID | Encrypted | IHS | Peripheral Devices | Applications |
| --- | --- | --- | --- | --- | --- |
| 2134 | A_B123 | (Y) | Lati5520 | 4K Webcam, WD19TBS Dock | ZOOM, OFFICE 365, TEAMS |
| 0904 | V_V456 | (Y) | Lati3520 | HD Webcam, TB18DC Dock | TEAMS, CHROME |

Table 1 illustrates, for each workspace ID and/or user ID, examples of: encryption settings (e.g., yes or no, type of encryption, etc.), an identification of the user's IHS 100 (e.g., machine ID, service tag, model number, etc.), an identification of peripheral devices connected to IHS 100, including any docking station (e.g., a device class, a device type, a vendor identifier, a firmware revision, a device topology, a composite tree structure, bus capability, supported protocol(s), a number of ports, etc.), and/or a list of applications that are executing (or that can execute, such as an application whitelist) on IHS 100, including any collaboration or video conferencing applications.

ELD 211 may also be configured to perform peripheral device discovery, for example through OS inbox drivers 209 and/or BIOS/UEFI/EC 109. As such, ELD 211 may be responsible for the discovery of plug-and-play (pnp) devices attached to IHS 100, wireless peripherals associated with IHS 100, and/or differences between previous workspace configurations and current workspace configurations.

Filter driver 212 is a kernel mode filter driver that collects information discovered from peripheral devices, such as model/vendor information, firmware information, etc. and sends that information to ELD 211 for signing (e.g., with a TPM key) to help attest that the workspace is intact, safe, untampered, or uncompromised, for example, by making sure that only approved devices and applications are being used in that workspace.

Endpoint agent 220 executes on IHS 100 along with other applications 219 in user space 214. In various embodiments, endpoint agent 220 is coupled to OS inbox drivers 209 and IPF stack 215, and in remote communications (e.g., over the Internet) with remote service 222 of cloud services 221, shown in FIG. 2B. In some embodiments, endpoint agent 220 may be configured to communicate with backend systems (not shown) to obtain one or more lists of approved IHSs, users, access locations, peripheral devices, and/or applications for enterprise users. Endpoint agent 220 may also actively monitor user applications in execution, peripheral devices connected to and disconnected from IHS 100, and/or IHS location changes.

In some embodiments, remote service 222 may be configured to provide one or more services to IHS 100, in a secure manner, after verifying the validity of a workspace certificate created by DPC 210. Remote service 222 may also be configured to communicate with management consoles 224 accessible to administrator 223 to onboard and manage workspaces and their respective peripheral devices.

When IHS 100 is coupled to docking station 202A, DPC 233 may be executed, at least in part, by docking station 202A (e.g., instead of DPC 210). In that case, docking station 202A may be coupled to its own set of peripheral devices 225, including, for example, monitor 226A, audio devices 226B, keyboard and/or mouse 226C, and video devices (e.g., webcam 226M). Similarly to IHS 100, dock 202A includes internal hardware/sensors 227 having BT/WiFi controller 228, UEFI/EC services 230 in UEFI/EC layer 229, and OS kernel drivers 232 in kernel space 231, which in turn execute DPC 233.

OS kernel drivers 232 may be coupled to endpoint agent 220 of IHS 100 and/or to dock agent 235 of dock 202A. Dock agent 235 in user space 234 may be coupled to local driver storage 236, remote service 222 (e.g., to enforce access policies), and peripheral devices 225 (e.g., to perform firmware installations or updates).

Figure 3:
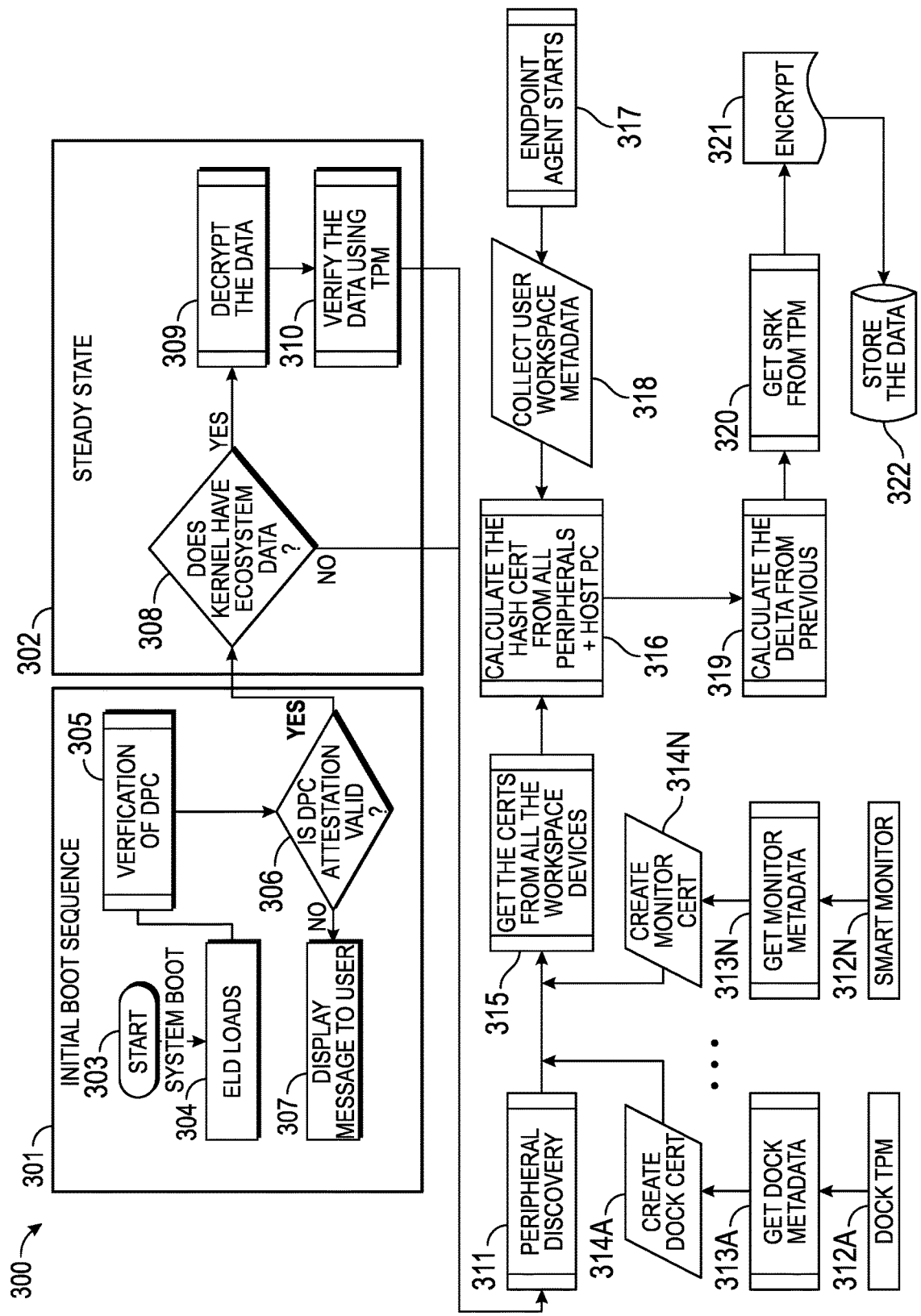
FIG. 3 depicts a flowchart of an example of a method for providing a workspace RoT, according to some embodiments.
Figure 4:
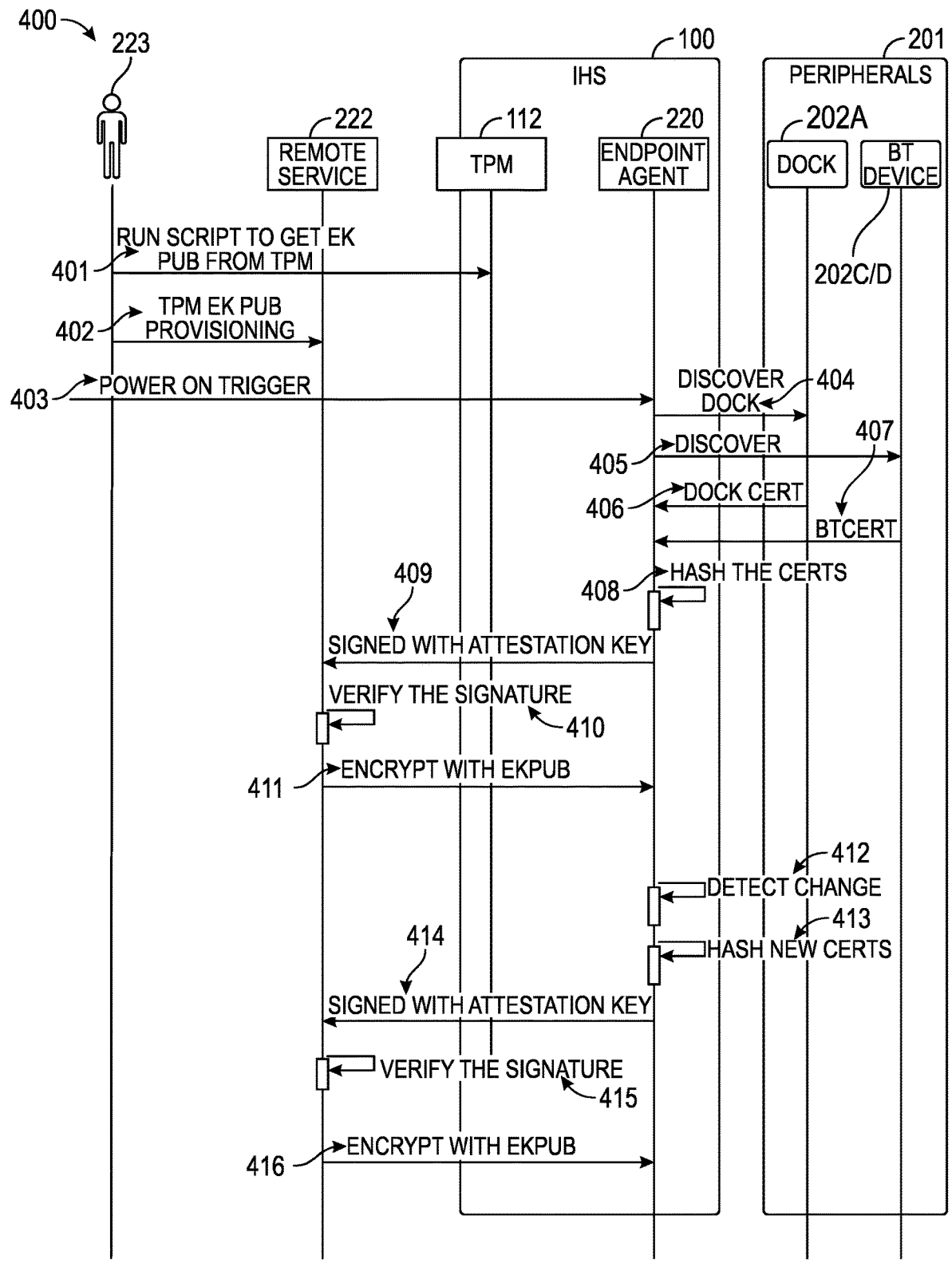
FIG. 4 depicts a flowchart of an example of a method for providing remote attestation of a workspace using a workspace RoT, according to some embodiments.

In operation, various components shown in FIGS. 2A and 2B may communicate with each other to implement one or more operations of method 300 of FIG. 3 and/or method 400 shown in FIG. 4.

Particularly, in FIG. 3, method 300 starts at 303 with initial boot sequence 301 before it moves on to steady state operations 302. At 304, ELD 211 loads and, at 305, DPC 210 is verified or attested. At 306, if the DPC attestation or verification is unsuccessful, block 307 displays a message to the user of IHS 100 or to administrator 223. If the DPC attestation or verification is successful at 306, then method 300 enters steady state 302.

At 308, method 300 determines if kernel 208 and/or 231 has workspace or ecosystem data. If so, at 309 method 300 decrypts the workspace data, and at 310 it verifies the workspace data using TPM 112. Otherwise, at 311, method 300 may perform peripheral device discovery. For example, at 312A, A dock TPM or security processor 312A may get dock metadata 313A and create a digital certificate at 314A that contains a public key associated with dock 202A, as well as dock metadata (e.g., display ID, vendor ID, etc.). Similarly, smart display processor 312N may get display metadata 313N and create another digital certificate that contains a public key associated with display 202B or 226A at 314N, as well as display metadata (e.g., display ID, vendor ID, etc.). At 315, method 300 collects all digital certificates from all peripheral devices.

At 316, method 300 calculates a hash of the peripheral devices' certificates and IHS 100 hardware/software certificates (or contents thereof). At 317, endpoint agent 220 starts, and at 318 it collects user workspace metadata, which is then further provided to block 316.

At 319, a difference or delta between a current workspace configuration, as determined from block 316, and a previous workspace configuration, is determined. If there is a difference, or if the difference meets a selected threshold, block 319 may trigger an alarm or other responsive/corrective action. At 320, method 300 gets an SRK from TPM 112. At 321, method 300 encrypts the metadata collected at block 318, and at 322 it stores the encrypted data (e.g., in storage 213).

FIG. 4 depicts a flowchart of an example of method 400 for providing remote attestation of a workspace using a workspace RoT, according to some embodiments. At 401, during a manual pre-provisioning step, administrator 223 runs a script (via management console 224) to obtain a public Endorsement Key (EKPUB) from TPM 112 of IHS 100. Then, at 402, administrator 223 provides the EKPUB to remote service 222. In this implementation, remote service 222 is configured to provide any suitable service or communication to IHS 100 securely, upon attestation of a workspace certificate and/or modified workspace certificates.

When IHS 100 is powered on at 403 (e.g., upon reboot), endpoint agent 220 discovers dock 202A at 404 and BT device 202C/D at 405. At 406, endpoint agent 220 receives a digital certificate from dock 202A, and at 407, endpoint agent 220 receives another digital certificate from BT device 202C/D. At 408, endpoint agent 220 (or DPC 210) hashes or combines at least portions of the peripheral devices' digital certificates and signs the hash with a TPM attestation key at (e.g., a private key of the EK) to create a workspace certificate, which is then sent to remote service 222 at 409.

At 410, remote service 222 verifies the integrity of the workspace, for example, by decrypting the workspace certificate using the TPM's EKPUB and comparing the contents of the certificate (e.g., peripheral device metadata) against expected lists. If the attestation is successful, at 411 remote service 410 provides a service to IHS 100 securely encrypted with EKPUB.

At 412, endpoint agent 220 may detect a contextual change (e.g., an existing peripheral device is disconnected, a new peripheral device is connected, an application is closed or open, an IHS location has changed, etc.). In response, at 413, endpoint agent 220 may receive new certificates from one or more of peripherals 201 and/or it may remove a certificate associated with a disconnected device, and it may hash the new set of certificates into a modified workspace certificate. At 414, the modified workspace certificate signed with the attestation key is send to remote service 222. At 415, remote service 222 verifies the signature and, if the verification is successful, at 416 remote service 410 provides a service to IHS 100 encrypted with EKPUB.

As such, systems and methods described herein provide a virtualized RoT embodied as a workspace certificate of all the certificates generated by individual peripheral devices cryptographically protected by the EKPUB key from the TPM. These techniques allow securing a workspace as a trusted group (e.g., devices, communications, data, configurations within each device, etc.) using a virtualized RoT, as opposed to applying individual device policies in silo.

In a pre-provisioning step, an administrator may run a script to retrieve the EKPUB key from the TPM, and provision it in selected remote services. In some cases, a service tag, a workspace ID, and/or a user ID may be used as identifiers of a workspace certificate. The other contents of the certificate are unique to each workspace, which allows systems and methods described herein to protect the integrity of the user's workspace on any device they may log into.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, IoT devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a processor; and
a memory coupled to the processor, the memory having program instructions stored thereon that, upon execution, cause the IHS to:
receive a digital certificate from each of a plurality of peripheral devices coupled to the IHS in a workspace;
combine at least portions of the digital certificates to create a workspace certificate unique to the workspace; and
execute an endpoint agent, wherein the endpoint agent is configured to monitor one or more user applications in execution, and the plurality of peripheral devices coupled to the IHS, wherein the endpoint agent is configured to hash the at least portions of the digital certificates and sign the hash with a key provided by a Trusted Platform Module (TPM) to create the workspace certificate.

2. The IHS of claim 1, wherein the plurality of peripheral devices comprises a docking station.

3. The IHS of claim 1, wherein the plurality of peripheral devices comprises at least one of: a display, an audio device, a user input device, or a video device.

4. The IHS of claim 1, wherein the workspace certificate comprises an indication of a workspace identifier.

5. The IHS of claim 1, wherein the workspace certificate comprises an indication of at least one of: an IHS identifier, an IHS service tag, or a user identifier.

6. The IHS of claim 1, wherein the workspace certificate comprises, for one or more of the plurality of peripheral devices, an indication of at least one of: a device class, a device type, a vendor identifier, a firmware revision, a device topology, a bus capability, or a supported protocol.

7. The IHS of claim 1, wherein the workspace certificate is encrypted with the key provided by the TPM of the IHS.

8. The IHS of claim 7, wherein the key comprises a public Endorsement Key (EK).

9. The IHS of claim 7, wherein the program instructions, upon execution, further cause the IHS to transmit an encrypted copy of the workspace certificate to a remote service configured to determine whether the workspace is intact.

10. The IHS of claim 9, wherein to determine whether the workspace is intact, the remote service is configured to decrypt the encrypted copy of the workspace certificate with the key.

11. The IHS of claim 1, wherein the program instructions, upon execution, further cause the IHS to:
   detect an addition or removal of a peripheral device to or from the plurality of peripheral devices to produce a modified workspace; and
   in response to the detection, create a modified workspace certificate unique to the modified workspace.

12. The IHS of claim 11, wherein the program instructions, upon execution, further cause the IHS to:
   transmit an encrypted copy of the modified workspace certificate to a remote service configured to determine whether the workspace is intact.

13. A method, comprising:
   receiving, by one or more processors, a workspace certificate from an Information Handling System (IHS) or a docking station disposed in a workspace having a plurality of peripheral devices uniquely associated with the workspace and coupled to the IHS or the docking station, wherein the workspace certificate is created based, at least in part, upon a combination of at least portions of digital certificates provided by each of the plurality of peripheral devices;
   determining whether the workspace is intact based upon contents of the workspace certificate; and
   executing, by the one or more processors, an endpoint agent, wherein the endpoint agent is configured to monitor one or more user applications in execution, and the plurality of peripheral devices coupled to the IHS, wherein the endpoint agent is configured to hash the at least portions of the digital certificates and sign the hash with a key provided by a Trusted Platform Module (TPM) to create the workspace certificate.

14. The method of claim 13, further comprising decrypting the workspace certificate using a public Endorsement Key (EK) of a Trusted Platform Module (TPM) of the IHS.

15. The method of claim 13, wherein the contents of the workspace certificate comprise an indication of at least one of: a workspace identifier, an IHS identifier, an IHS service tag, or a user identifier.

16. The method of claim 13, wherein the contents of the workspace certificate comprise, for one or more of the plurality of peripheral devices, an indication of at least one of: a device class, a device type, a vendor identifier, a firmware revision, a device topology, a bus capability, or a supported protocol.

17. A memory storage device having program instructions stored thereon that, upon execution by an Information Handling System (IHS), cause the IHS to:
   receive a digital certificate from each of a plurality of peripheral devices coupled to a user's IHS in a workspace;
   combine at least portions of the digital certificates to create a workspace certificate unique to the workspace; and
   execute an endpoint agent, wherein the endpoint agent is configured to monitor one or more user applications in execution, and the plurality of peripheral devices connected to the IHS, wherein the endpoint agent is configured to hash the at least portions of the digital certificates and sign the hash with a key provided by a Trusted Platform Module (TPM) to create the workspace certificate.

18. The memory storage device of claim 17, wherein the program instructions, upon execution, further cause the IHS to transmit an encrypted copy of the workspace certificate to a remote service configured to determine whether the workspace is intact.

19. The memory storage device of claim 18, wherein the program instructions, upon execution, further cause the IHS to create the encrypted copy using a public Endorsement Key (EK) of a Trusted Platform Module (TPM) of the user's IHS.

20. The memory storage device of claim 17, wherein the program instructions, upon execution, further cause the IHS to:
   detect an addition or removal of a peripheral device to or from the plurality of peripheral devices to produce a modified workspace; and
   in response to the detection, create a modified workspace certificate unique to the modified workspace.

* * * * *